No. 792,707.

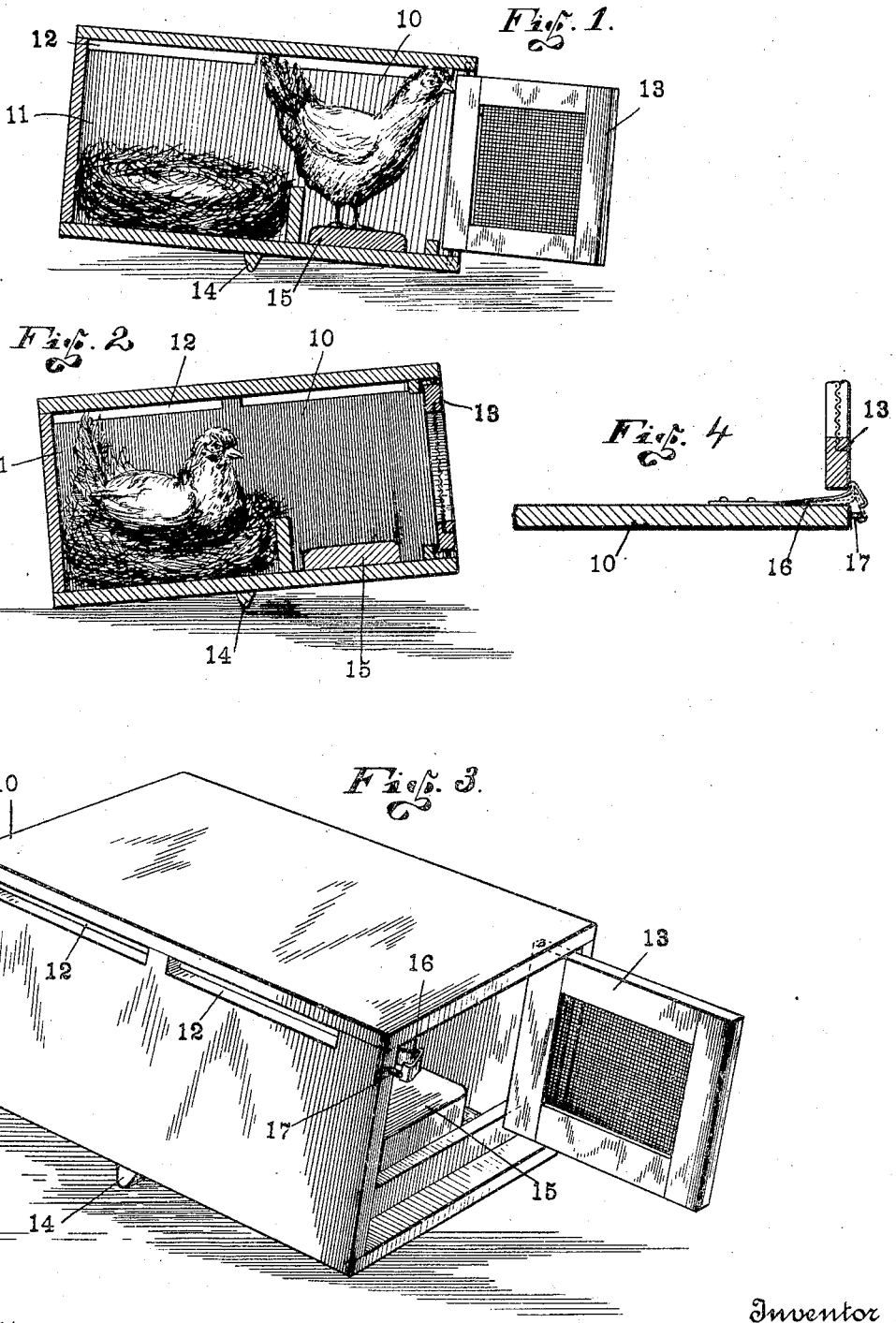

Patented June 20, 1905.

UNITED STATES PATENT OFFICE.

GEORGE F. JENKINS, OF INDIANAPOLIS, INDIANA, ASSIGNOR OF ONE-HALF TO ISAAC O. RUSSELL, OF INDIANAPOLIS, INDIANA.

POULTRY-NEST.

SPECIFICATION forming part of Letters Patent No. 792,707, dated June 20, 1905.

Application filed December 23, 1904. Serial No. 238,041.

*To all whom it may concern:*

Be it known that I, GEORGE F. JENKINS, a citizen of the United States, residing at Indianapolis, in the county of Marion and State of Indiana, have invented certain new and useful Improvements in Poultry-Nests, of which the following is a specification.

In the care and handling of poultry it is found that some hens are inclined to crowd others from the nests and that if a hen can be undisturbed during the laying time better results are obtained.

The object of my invention is to provide a simple automatic contrivance by means of which the entrance of a hen to the nest will automatically close the entrance-door and her movement from the nest will open the door.

The accompanying drawings illustrate my invention.

Figure 1 is a central vertical section showing the parts in the position assumed as the hen leaves the nest. Fig. 2 is a similar view with the parts in positions assumed with the hen on the nest; Fig. 3, a perspective view of the nest in receiving position, and Fig. 4 a detail showing a means for positively locking the door in order to keep a hen on the nest for a desired period.

In the drawings, 10 indicates a box-like structure provided at one end with a nest portion 11 and having suitable ventilating-openings 12, if desired. One end of the box is open, and hinged therein on a vertical pivot is a door 13, which swings freely on its hinge. On the bottom of the box 10, at about the middle thereof, I provide a transverse bar 14, the nest being slightly overbalanced on the entrance side, so that under normal conditions the box will be in the position shown in Fig 3, where the entrance end is lower than the nest end and the door 13 stands open. If desired, any suitable counterbalancing-weight 15 may be placed in the entrance end of the nest.

In operation the normal position of the parts is that shown in Fig. 3, and a hen may readily enter the nest. As she passes to the rear of the box onto the nest portion 11 her weight overbalances the structure on the cross-bar 14, and thus tips the whole nest to the position shown in Fig. 2, whereupon door 13 will automatically swing shut. When the hen is ready to leave the nest, she passes to the front, and as her weight is transferred to the opposite side of the cross-bar 14 the structure is returned to the position shown in Fig. 1, whereupon the door 13 automatically swings open and remains open until the hen again enters the nest. If desired, the door 13 may be locked in position by means of a suitable spring-latch 16, so as to thus keep a hen on the nest until released. This feature is desirable in cases where the eggs of a particular hen are to be kept separate from the others. The latch 16 may, if desired, be retracted and held in the position shown in dotted lines in Fig. 4 by means of a pin 17, which will thus serve to throw the latch out of commission.

I claim as my invention—

1. A poultry-nest consisting of a main box-like body having a bottom with a transverse ridge upon which the body may tip from one position to another, and a door hinged at the open end of the body and adapted to swing as the main body is tipped upon the transverse ridge.

2. A poultry-nest consisting of a main box-like body having a bottom with a transverse ridge upon which the body may tip from one position to another, a door hinged at the open end of the body and adapted to swing as the main body is tipped upon the transverse ridge, and a catch adapted to engage the door and hold it closed.

3. A poultry-nest consisting of a main box-like body having a rocker-bottom upon which the body may tip from one position to another, and a door hinged at the open end of the body and adapted to swing as the main body is tipped.

In witness whereof I have hereunto set my hand and seal, at Indianapolis, Indiana, this 20th day of December, A. D. 1904.

GEORGE F. JENKINS. [L. S.]

Witnesses:
 ARTHUR M. HOOD,
 JAMES A. WALSH.